(No Model.)
E. N. DICKERSON.
CONSTRUCTION OF BATTERIES.
No. 581,104. Patented Apr. 20, 1897.
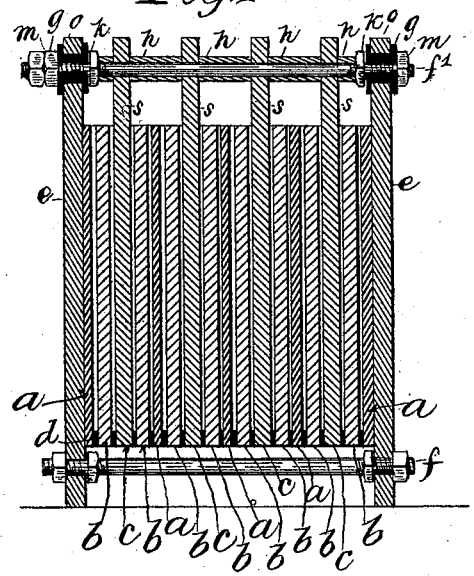
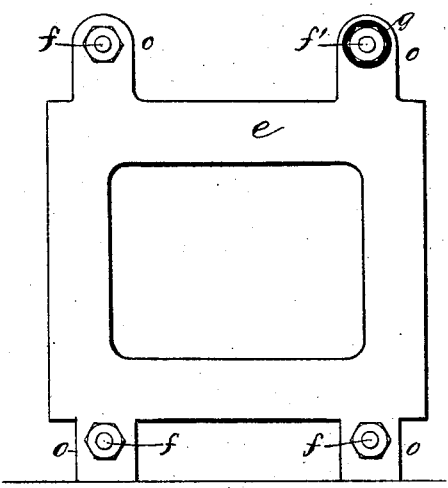
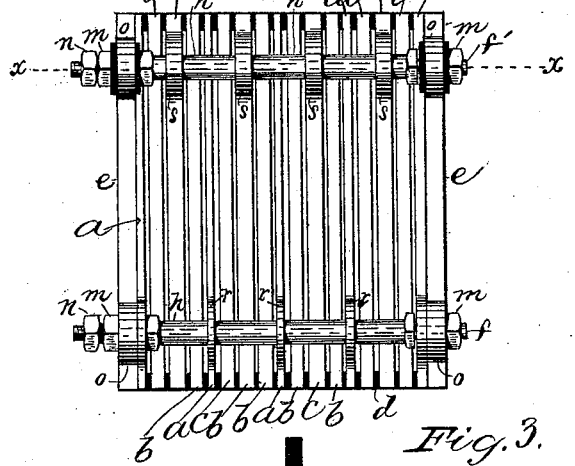
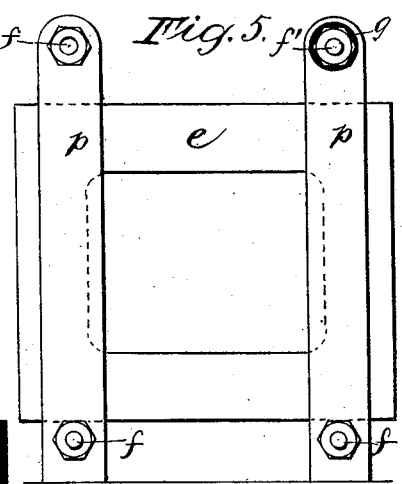
WITNESSES:
INVENTOR
E N Dickerson

UNITED STATES PATENT OFFICE.

EDWARD N. DICKERSON, OF NEW YORK, N. Y.

CONSTRUCTION OF BATTERIES.

SPECIFICATION forming part of Letters Patent No. 581,104, dated April 20, 1897.

Application filed March 28, 1892. Serial No. 426,662. (No model.)

*To all whom it may concern:*

Be it known that I, EDWARD N. DICKERSON, of the city, county, and State of New York, have invented a new and useful Improvement in the Construction of Batteries, of which the following is a full, true, and exact description, reference being had to the accompanying drawings.

This invention relates to an improved construction of batteries by means of which the component parts can be readily removed and by which any containing box or cell is avoided.

It is very important in this class of batteries to reduce the weight as much as possible, and, further, to make a battery which can be readily put together and taken apart without destroying it.

By my invention, as I prefer to use it, no cell whatever is employed, but the elements themselves form, with certain gaskets, the cells.

My invention is shown as applied to a secondary battery having plates of iron and carbon and separating-plates, and wherein the partition, as of fibrite, is non-porous with reference to the electrolyte or as a filter, while conductive with reference to the current when wet, the application of the invention being, for instance, to the battery patented to Isaiah L. Roberts on the 8th day of December, 1891, No. 464,665; but of course my invention is applicable to other constructions of battery.

My invention will be readily understood from the accompanying drawings, in which—

Figure 1 represents a section through Fig. 2 on the line $x\,x$; Fig. 2, a plan view of my battery; Fig. 3, an elevation of the separating-strip or gasket; Fig. 4, an elevation of the compression-plate, and Fig. 5 a modified construction of the compression-plate.

The essential construction of my battery consists in making the plates of substantially uniform size and placing between each plate and the adjacent plate or partition a gasket—as, for instance, one shown in Fig. 3—and then applying pressure upon the plates and gaskets, so as to make independent cells.

In my drawings, $a$ represents plates of iron, $b$ separating-plates of fibrite, and $c$ plates of carbon. Between each plate and the adjacent plate or separator is shown a gasket $d$, preferably made of a suitable rubber compound. On the outside of the battery as made up are the frames $e$, drawn together by bolts $f$. In case the plates are to be brought very near together it is advisable to place some separating or non-conducting body between them or between the plates and the separators. I have found, for instance, that a separator made of ordinary cord-net is very efficient, though strips of wood may be used, if desired. The frames $e$ are drawn together when the pile of plates is made by nuts $m$, screwing on the rods $f$. Set-screws may of course be employed, if desired. The frames are continued into the lugs $o$, through which the bolts pass, and the lower lugs $o$ may serve as legs for the battery. Instead of utilizing these lugs, however, separate straps $p$ may be employed, bearing against frames $e$, the result being the same. This construction is shown in Fig. 5.

I prefer to utilize the upper rods $f\,f'$ for electrical conductors, and I therefore carry up my carbon and iron into projections or lugs $s\,r$, as shown, drilled to admit of the passage of the bolts $f\,f'$. The bolt $f'$ should be insulated by thimbles $g$ or in any other suitable way, as shown.

Between each lug and the adjacent one is interposed a suitable thimble $h$, and, as shown in Fig. 1, all the carbons are connected to each other and drawn together and connected to the rod $f'$ by the thimbles $h$ and screws $k$. A convenient way of making this connection is to copperplate these lugs of the carbons and to use copper washers between them. I also find it advisable to tin the upper ends of the iron plates and use tinned thimbles between them. These matters may, however, be varied according to the judgment of the operator. Of course in the drawings the thickness of the plates is greatly exaggerated and the drawings should be understood as illustrative only.

It is obvious that though I have shown my invention as applied to a battery with a separating non-porous partition, yet parts of my invention can be utilized in other forms of battery; also, that the form of plates may be varied, a U-shaped plate being somewhat convenient, the gaskets being correspondingly varied. In this case, of course, only three bolts would be required.

The electrolyte used will depend upon circumstances, but when plates of the character described above are used I find that a solution of chlorid of iron is satisfactory.

It will be observed that my connecting-rods extend outside of the battery proper.

If the battery-plates are iron and carbon and the electrolyte chlorid of iron, the reaction is that the passage of the current decomposes the chlorid of iron in solution in the iron compartment, carrying the chlorin over to the carbon electrode and depositing metallic iron on the iron plate. The transferred chlorin is taken up by the chlorid of iron in the carbon or anode compartment, one additional atom of chlorin being absorbed for each atom of iron present in the chlorid-of-iron solution ($Fe_2Cl_4$) in the carbon compartment, forming perchlorid of iron, ($Fe_2Cl_6$,) and this continues until the solution in the iron compartment is depleted or that in the carbon compartment has absorbed its full quota of chlorin. On discharging a return to the original conditions occurs, but practically only when the plates are connected together. On closing the circuit the perchlorid returns to the condition of chlorid of iron and the excess of chlorin goes back to the iron electrode, with which it combines.

What I claim as my invention, and desire to secure by Letters Patent, is—

1. In a caseless battery, the combination with the plates respectively electropositive and electronegative to each other, each plate being provided with extensions, the extensions of the positive plates being at a different point from the extensions of the negative plates, of gaskets between said elements and extending around three edges of the plates, the outer frames, screw-rods connecting the frames for drawing the plates against the gaskets, and two of the rods connecting respectively with the extensions of the different plates, substantially as described.

2. The combination with the frames $e$, of the plates $a$, $c$, respectively electropositive and electronegative to each other and each having extensions, the extensions of the positive plates being at a different point from the extensions of the negative plates, the separators between the plates, the gaskets between the separators and plates and extending around three edges of the latter, and the bolts connecting the frames, two of the bolts also connecting the positive and the negative elements, respectively, together, one of said bolts being insulated from the frame, substantially as described.

In testimony whereof I have signed my name to this specification in the presence of two subscribing witnesses.

E. N. DICKERSON.

Witnesses:
ANTHONY GREF,
WM. M. ILIFF.